United States Patent Office 3,529,152
Patented Sept. 15, 1970

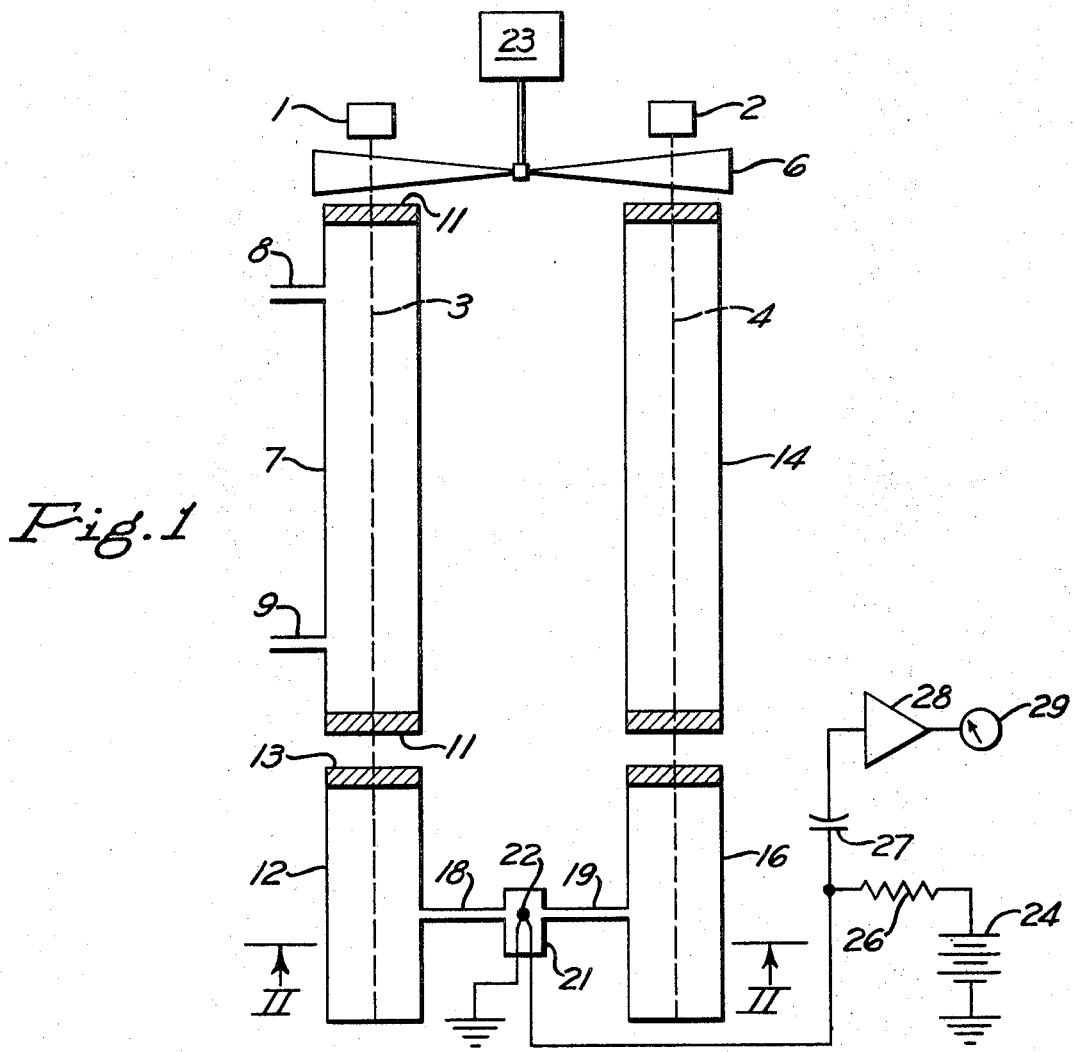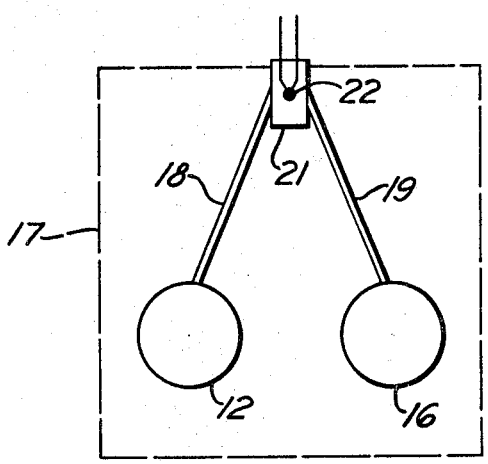
Fig. 1
Fig. 2
INVENTORS.
JOHN P. STRANGE
GLENN H. FERTIG
BY
Brown, Critchlow, Flick & Peckham
ATTORNEYS.

3,529,152
INFRARED RADIATION DETECTION DEVICE FOR A NON-DISPERSIVE SELECTIVE INFRARED GAS ANALYSIS SYSTEM
John P. Strange, Murrysville, and Glenn H. Fertig, Cheswick, Pa., assignors to Mine Safety Appliances Company, Pittsburgh, Pa., a corporation of Pennsylvania
Filed June 23, 1967, Ser. No. 648,340
Int. Cl. G01n 21/26, 21/36
U.S. Cl. 250—43.5                                    5 Claims

ABSTRACT OF THE DISCLOSURE

This invention relates to non-dispersive and selective infrared gas analysis, in which infrared rays are passed by way of a shutter device along two beam paths, one an analytical path containing a sample gas to be tested and the other a reference path containing a reference gas, the rays afterwards acting upon the contents of two absorption chambers, one in each path, containing the component gas to be detected or a gas of similar infrared absorption properties. The invention is predicated on the combination of the foregoing elements with (1) a gas flow chamber that communicates with each of the absorption chambers and (2) a detector in the form of a thermally sensitive electrical resistance element mounted in an enlarged portion of the flow chamber that is responsive to the flow of gas through the flow chamber.

BACKGROUND OF THE INVENTION

There are basically two kinds of non-dispersive, selective infrared detectors. One is the Pfundt type of detector described in Pat. No. 2,212,111, in which infrared rays are passed through a sample gas into a detector chamber filled with a gas absorbing in the selected wavelengths to be detected and measuring the increase in temperature of such gas by means of a sensing element, such as a thermocouple. The Pfundt detector, although selective with respect to wavelengths of energy absorption, has a low sensitivity and a relatively low frequency response and has not been commercially successful.

Another type of detector is that described by Luft in Pat. No. 3,162,761 and by Golay in Pat. No. 2,750,834, in which the absorption of energy is measured by the increase in pressure within the detector chamber, as the gas expands. Generally, the pressure increase is measured by a flexible diaphragm forming one element of a condenser microphone. Such detectors have the disadvantage of sensitivity to mechanical shock and vibration, because both the gas in the detector chamber and the flexible diaphragm have inertia and move relative to the chamber when the detector is subjected to mechanical shock or vibration. This type of detector has the further disadvantage of requiring a complicated electronic circuit to detect the very small variations in capacitance that occur on movements of the diaphragm of the condenser microphone.

It is among the objects of the present invention to provide an improved method and apparatus for infrared gas analysis that will be sensitive and selective to particular absorption wavelengths, that will greatly minimize sensitivity to shock and vibration, and that will use a very simple electrical circuit for detecting the presence and concentration of a particular gaseous component.

BRIEF DESCRIPTION OF THE DRAWINGS

A preferred embodiment of the invention is shown in the attached drawings, in which FIG. 1 is a diagrammatic view of the infrared gas analyzer; and FIG. 2 is a diagrammatic cross-section of a portion of the apparatus, along the line II—II of FIG. 1.

DESCRIPTION OF THE INVENTION

Referring to the drawings, the analyzer of this invention includes a source of infrared radiation, shown here as two substantially identical, side-by-side sources 1 and 2, although it is obvious that they could be combined into a single source and then split, for transmitting radiation along two parallel beam paths. One of those beams, herein called the analytical beam, is composed of rays from source 1 extending parallel to the optical axis 3 (shown in broken lines). The other beam, herein called the reference beam, consists of rays from source 2 and extends parallel to the axis 4. The analytical beam passes from source 1 through a chopper region, where the rays are periodically interrupted by a rotating shutter device 6. The beam than goes through a sample or analytical cell 7, which is provided with a gas inlet 8 and a gas outlet 9 and is otherwise sealed from the atmosphere by infrared-transparent windows 11 at each end. Finally, the analytical beam enters and analytical absorption chamber 12 through a window 13 similar to window 11.

The reference beam follows a path parallel to the analytical beam, passing from source 2 through the chopper region traversed by shutter 6, then through a reference cell 14 similar to the sample cell 7, except that the reference cell contains a fixed volume of reference gas, which is preferably of the same composition as the sample gas but without the particular component that is to be detected and measured. After leaving the reference cell, the reference beam enters a reference absorption chamber 16, which is identical with the analytical absorption chamber 12 previously described. Both the analytical and reference absorption chambers may be in the form of cylindrical metal tubes that are supported in a metal heat sink 17, the latter element being outlined in broken lines in FIG. 2.

The two absorption chambers 12 and 16 are connected by passages 18 and 19, respectively, to a gas flow chamber 21 located between chambers 12 and 16. Within chamber 21 is supported a detector 22, such as a thermistor or other thermally sensitive device, that is sensitive to gas flow. The detector is preferably so supported in chamber 21 that gas passing from one absorption chamber to the other will flow over the detector to produce a maximum cooling effect. In accordance with this invention, the detector unit (which includes the absorption chambers 12 and 16, flow chamber 21, and the connecting passages 18 and 19) is entirely filled with a mixture of (a) the gaseous component to be detected, or some other gas or gaseous mixture having similar infrared absorption characteristics, and (b) a non-absorbing diluent gas.

In operating the analyzer, equivalent beams of infrared energy are transmitted along the analytical and reference paths through the sample and reference cells to the absorption chambers. These beams are simultaneously and periodically interrupted by the optical chopper or rotary shutter device 6, which is rotated by an electrical motor 23, so that pulses of infrared energy at the chopping frequency pass along the two beam paths. If the pulses reaching the detector unit contain energy in those wavelength absorbed by the gas in that unit, the gas therein will be heated and tend to expand in accordance with the gas laws. If both absorption chambers 12 and 16 receive and absorb the same amount of energy, the gas expansion in each of those chambers will be equal and there will be an increase in pressure therein and in passages 18 and 19 and in flow chamber 21, but there will be no gas flow through the flow chamber. This condition will prevail when the sample cell 7 contains a sample gas that includes none of the component to be detected and the reference cell 14 contains a similar gas. In contrast, when the sample gas in cell 7 includes a given concentration of the component to be detected (that component being absent from the gas in the reference cell) some of the radiant energy in the analytical beam will be absorbed in the component wavelength as the beam passes through the sample cell, but similar absorption will not occur in the reference cell. As a result, the pulses of infrared radiation reaching the analytical absorption chamber 12 will have smaller energy in the wavelengths of interest than will the pulses of radiation reaching the reference absorption chamber 16. Accordingly, less infrared energy will be absorbed and transferred into heat in chamber 12 than in chamber 16, and the gas in the latter will expand more than that in the former to create a flow of gas from chamber 16 to chamber 12 through the connecting passages and the flow chamber 21. This gas flow will cool the thermistor, or other thermally responsive detector, and the cooling effect can be measured as a change in resistance, the amount of change being a function of the temperature coefficient of resistivity of the detector element used.

Because of the pulsating nature of the gas expansion in the absorption chambers, which follows the frequency of the beam chopper, the resulting temperature change in the thermistor 22 is also of a pulsating character. By making the thermistor a component of an electrical circuit such as that shown in FIG. 1, an alternating electrical signal is generated and can be measured. In its simplest form, the thermistor can be made one arm of a Wheatstone bridge and the varying resistance of that element detected by means of a meter or potentiometer across the bridge in the usual manner. It is more convenient, however, to measure the electrical output of detector 22 by impressing it on the input circuit of an A-C amplifier, which, for best results, is tuned to the frequency of the detector signal. It is this latter circuit that is shown diagrammatically in FIG. 1; it includes a source of direct current 24, a resistor 26, a capacitor 27, an amplifier 28, and a meter 29.

Because detector 22 of the present invention has a very low mass, its sensitivity to shock and vibration is much less than the diaphragm detector of the Luft analyzer. In the latter, the very nature of the sensitive diaphragm, which must be large relative to the gas volume to sense the small pressure pulses, makes the diaphragm susceptible to movement under shock or vibration. Moreover, the gas itself has inertia and moves under shock or vibration, creating momentary pressure variations within the volume of gas in the detector unit. These pressure variations are transmitted in the Luft analyzer directly to the diaphragm and cause it to move. In contrast, such pressure variations in the detector of the present invention do not flow across the detector. By properly locating the points in chambers 12 and 16 for connecting the passages 18 and 19, the effect of gas movement relative to the walls of those chambers may be completely compensated. The best location of those points, as shown in the drawings, is adjacent the center of mass of the gas volumes in each chamber.

The effectiveness of the gas flow across the sensing element in the present invention can be enhanced by the geometry of chamber 21. It has been found that a good detector can be made by locating the sensing element 22 (1) in a flow chamber having a volume relatively large compared to the volume of the connecting passages 18 and 19 and (2) in the direct path of the gas emerging from one of those passages, create a venturi effect. Further enhancement may be obtained by changing the shape of the ports of the connecting passages to provide a jet stream over the detector element 22. Further improvement may follow the judicious selection of a diluent gas in the detector unit. Since the amount of the component to be detected (or equivalent absorbing gas) that is present in the detector unit need not generally exceed its expected concentration in the sample gas, a diluent gas can be selected that will optimize the combined cooling effect of the gases on detector 22, by consideration of such physical properties of the diluent gas as its specific heat, density, viscosity, and thermal conductivity.

Although the shutter 6 has been described herein as a rotary shutter, it will be obvious to those skilled in the art that a reciprocating shutter or other suitable means for periodically blocking the beams would work just as well. It will also be obvious that both beams need not be blocked simultaneously, as described herein. For example, they can be blocked alternately, in which case the gas in each absorption chamber will expand upon absorbing energy from the beam entering that chamber and such expansion will cause gas to flow from the chamber of higher pressure to the chamber of lower pressure, the direction of flow reversing in synchronization with the chopper frequency. If more energy is absorbed in one absorption chamber than in the other (as will be the case when the component of interest is present in the sample gas), then the gas flow will be greater in one direction than in the other; and the response of the detector element will be a series of alternating high and low signals, which can be measured by suitable conventional devices.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In an infrared analyzer of the type in which infrared rays from a source of radiation are passed by way of a shutter device along two beam paths, one an analytical path containing a sample gas to be detected and the other a reference path containing a reference gas, the combination with the elements recited of detection means comprising two radiation absorption chambers, one in each path, a gas flow chamber, passages connecting the flow chamber with each of the absorption chambers, a gas flow responsive device in the form of a thermally sensitive electrical resistance element mounted in the flow chamber in the path of gas flow therein, said chambers containing the gas to be detected or a gas with similar infrared absorption properties, the two beam paths being interrupted at regular intervals by the shutter device, such that absorption of infrared radiation by the sample gas will produce a differential flow of gas between the absorption chambers for cooling the resistance element, and said flow chamber being larger than each of said passages to enhance by venturi effect the effectiveness of the gas flow across the resistance element.

2. Apparatus according to claim 1, in which the said resistance element is a thermistor.

3. Apparatus according to claim 1, in which the passages connecting the flow chamber with the absorption chambers communicate with the latter adjacent the centers of mass of the gas therein.

4. Apparatus according to claim 1, in which the shutter device interrupts both beams simultaneously to produce, when the sample gas contains the component to be detected, an intermittent flow of gas from the absorption chamber in the reference path through the flow chamber to the absorption chamber in the analytical path.

5. Apparatus according to claim 1, in which the two absorption chambers have equal volumes.

References Cited

UNITED STATES PATENTS

| | | | |
|---|---|---|---|
| 2,555,327 | 6/1951 | Elliott | 250—43.5 |
| 3,123,295 | 3/1964 | Martin | 250—43.5 X |

FOREIGN PATENTS 786,516  11/1957  Great Britain.

WILLIAM F. LINDQUIST, Primary Examiner

U.S. Cl. X.R.

250—83.3